United States Patent
Nguyen et al.

(10) Patent No.: US 10,885,519 B1
(45) Date of Patent: Jan. 5, 2021

(54) MOBILE TRANSACTION PLATFORM

(71) Applicants: Long Tien Nguyen, Beverly Hills, CA (US); Martin Russell Peck, Surprise, AZ (US); Emerson Chun Lun Tan, London (GB); Julian Finn, Hamburg (DE); Dirk Jäckel, Berlin (DE); Meredith Leigh Patterson, Brussels (BE)

(72) Inventors: Long Tien Nguyen, Beverly Hills, CA (US); Martin Russell Peck, Surprise, AZ (US); Emerson Chun Lun Tan, London (GB); Julian Finn, Hamburg (DE); Dirk Jäckel, Berlin (DE); Meredith Leigh Patterson, Brussels (BE)

(73) Assignee: Mautinoa Technologies, LLC, Washington, DC (US)

(*) Notice: Subject to any disclaimer, the term of this patent is extended or adjusted under 35 U.S.C. 154(b) by 0 days.

(21) Appl. No.: 16/792,628

(22) Filed: Feb. 17, 2020

(51) Int. Cl.
  *G06Q 20/38* (2012.01)
  *G06Q 20/40* (2012.01)
  (Continued)

(52) U.S. Cl.
  CPC ..... *G06Q 20/3829* (2013.01); *G06Q 20/0658* (2013.01); *G06Q 20/3229* (2013.01);
  (Continued)

(58) Field of Classification Search
  CPC ........... G06Q 20/3829; G06Q 20/0658; G06Q 20/4033; G06Q 20/3229; G06Q 2220/00;
  (Continued)

(56) References Cited

U.S. PATENT DOCUMENTS 5,870,723 A * 2/1999 Pare, Jr. ........... G06Q 20/40145
                                                    705/39
6,003,014 A * 12/1999 Lee ..................... G06Q 20/105
                                                    705/13

(Continued)

OTHER PUBLICATIONS

Gianluigi Me, Alex Schuster; "A secure and reliable local payment system"; (Year: 2005).*

(Continued)

*Primary Examiner* — Patrick McAtee
*Assistant Examiner* — Edgar R Martinez-Hernandez
(74) *Attorney, Agent, or Firm* — Kelley Drye & Warren LLP

(57) ABSTRACT

Systems and methods for securely processing one or more digital transactions between a sender and a recipient using smartcards assigned to the sender and the recipient. Stored on each smartcard are the asset balances of one or more accounts owned by or accessible to the user of the smartcard. If internet access is available at the time of the transaction, a record of the transaction may be uploaded to a secure and auditable storage structure. If internet access is unavailable at the time of the transaction, a record of the transaction may be securely stored by both the sender's smartcard and the recipient's smartcard. When internet access becomes available, the transaction records may be transferred to the internet by a terminal and deleted from the smartcards. Records of the account balances of the users of the smartcard would be updated in accordance with the transaction.

24 Claims, 2 Drawing Sheets

(51) Int. Cl.
  *G06Q 20/32* (2012.01)
  *G06Q 20/06* (2012.01)
  *H04L 9/08* (2006.01)
(52) U.S. Cl.
  CPC ....... *G06Q 20/388* (2013.01); *G06Q 20/4033* (2013.01); *H04L 9/0866* (2013.01); *G06Q 2220/00* (2013.01); *H04L 2209/38* (2013.01)
(58) Field of Classification Search
  CPC .. G06Q 20/388; H04L 9/0866; H04L 2209/38
  See application file for complete search history.

(56) References Cited

U.S. PATENT DOCUMENTS

| | | | | |
|---|---|---|---|---|
| 10,728,230 | B2* | 7/2020 | Lawson | H04W 12/0609 |
| 2001/0000535 | A1* | 4/2001 | Lapsley | G06K 9/00087 |
| | | | | 705/64 |
| 2002/0133467 | A1* | 9/2002 | Hobson | G06Q 20/04 |
| | | | | 705/64 |
| 2005/0204405 | A1* | 9/2005 | Wormington | H04N 21/44204 |
| | | | | 726/27 |
| 2006/0206709 | A1* | 9/2006 | Labrou | G07F 19/211 |
| | | | | 713/167 |
| 2007/0112676 | A1* | 5/2007 | Kontio | H04L 63/12 |
| | | | | 705/50 |
| 2007/0296544 | A1* | 12/2007 | Beenau | G07G 1/14 |
| | | | | 340/5.52 |
| 2008/0011825 | A1* | 1/2008 | Giordano | G06Q 20/32 |
| | | | | 235/380 |
| 2008/0035738 | A1* | 2/2008 | Mullen | G06Q 20/40 |
| | | | | 235/492 |
| 2008/0091944 | A1* | 4/2008 | von Mueller | G06F 21/606 |
| | | | | 713/168 |
| 2008/0201264 | A1* | 8/2008 | Brown | G07F 7/1016 |
| | | | | 705/67 |
| 2009/0044012 | A1* | 2/2009 | Bishop | G06Q 20/341 |
| | | | | 713/168 |
| 2009/0216678 | A1* | 8/2009 | May | G06Q 10/10 |
| | | | | 705/50 |
| 2009/0287760 | A1* | 11/2009 | Asai | G06Q 20/363 |
| | | | | 709/201 |
| 2011/0010295 | A1* | 1/2011 | Roy | G06Q 20/32 |
| | | | | 705/44 |
| 2013/0041776 | A1* | 2/2013 | Schunemann | G06Q 20/18 |
| | | | | 705/26.41 |
| 2013/0191290 | A1* | 7/2013 | Glendenning | G06Q 20/388 |
| | | | | 705/71 |
| 2013/0200999 | A1* | 8/2013 | Spodak | G05B 1/01 |
| | | | | 340/5.65 |
| 2014/0108263 | A1* | 4/2014 | Ortiz | G06Q 20/3223 |
| | | | | 705/71 |
| 2014/0372308 | A1* | 12/2014 | Sheets | G06Q 20/3674 |
| | | | | 705/44 |
| 2015/0073994 | A1* | 3/2015 | Nagayama | G06Q 20/02 |
| | | | | 705/64 |
| 2015/0262166 | A1* | 9/2015 | Singh | G06Q 20/3672 |
| | | | | 705/44 |
| 2016/0012465 | A1* | 1/2016 | Sharp | G06Q 20/384 |
| | | | | 705/14.17 |
| 2016/0078435 | A1* | 3/2016 | Frank | G06Q 20/3229 |
| | | | | 705/71 |
| 2016/0110696 | A1* | 4/2016 | Angus | G06Q 20/108 |
| | | | | 705/39 |
| 2016/0117660 | A1* | 4/2016 | Prakash | G06Q 20/3674 |
| | | | | 705/14.64 |
| 2017/0109742 | A1* | 4/2017 | Varadarajan | H04L 63/083 |
| 2017/0308894 | A1* | 10/2017 | McCown | G06Q 20/401 |
| 2017/0344962 | A1* | 11/2017 | Agrawal | G06Q 20/10 |
| 2018/0365683 | A1* | 12/2018 | Nevins | G06Q 20/354 |

OTHER PUBLICATIONS

Emir Husni, Adrian Ariono; "Development of Integrated Mobile Money System Using Near Field Communication (NFC)"; (Year: 2014).*

\* cited by examiner

MOBILE TRANSACTION PLATFORM

BACKGROUND OF THE INVENTION

In the last ten years, the humanitarian aid community has recognized people in need during a humanitarian crisis are much better served when they are given money and allowed to spend that money on the things they need, rather receiving handouts of goods. While handouts may suffice for the immediate aftermath of a catastrophe, over the medium to longer term, handouts distort local economies and disempower beneficiaries.

Using cash as aid, beneficiaries have more agency in their lives during times of considerable disruption. Cash aid also strengthens local vendors and prevents large-scale corruption by reducing communities' reliance on a limited number of wholesalers who drive prices upwards and corrupt supply chains. Direct cash transfers to individuals are typically the most efficient form of aid.

However, providing cash as aid introduced other challenges. Following significant disruption, there is a reduction in liquidity. Also, because cash is not traceable, it is difficult to prevent it from further the funding of weapons, terrorism in unstable areas, or petty corruption. Cash is difficult to move in bulk, and it is vulnerable during transport, especially where a mixture of high and low-value bills is required.

World leaders recognize current crises increasingly overstretch the conventional aid. Leading NGOs have pushed for cash to be recognized as the dominant aid modality, but until concerns about diversion, corruption, safety, security, and terrorist financing can be met, it is nearly impossible to distribute cash as aid in the areas where it is most needed.

Funds provided by electronic transactions may solve some of these problems because they are traceable, difficult to steal, and capable of being used by beneficiaries immediately upon receipt. Various services, applications, and systems existing today allow users to transfer currency or complete other types of transactions via electronic devices. For example, the mobile application Venmo offered by PayPal Holdings, Inc. allows users to establish an account and transfer money over the internet to other mobile device users who have a Venmo account. Also, the message application included with Apple Inc.'s current operating systems will allow users to transfer money over the internet from one user to another via Apple Pay.

Cryptocurrencies such as Bitcoin and Ethereum may also be used to securely transfer funds. These digital cash systems may be decentralized, but they require an internet connection in order to perform transactions, like the mobile applications described above.

A number of regions and communities, however, do not have reliable internet access because, for example, a robust local internet infrastructure has not been sufficiently developed. Also, in areas where internet access is typically available, internet access may be lost for a period of time when certain events occur, such as a power outage or damage to a cellular tower. Accordingly, an internet connection at a given location where two persons may seek to conduct a digital transaction may be poor, unreliable, unavailable and/or unsecure. When internet access is temporarily unavailable, transactions cannot be performed because the mechanisms and processes for auditing and ensuring the integrity of transactions rely on a trusted server operated by an online payment service provider. Bitcoin and other proof of work based cryptocurrencies don't work in intermittent network environments. In a high transaction environment, significant network outage or fragmentation can rapidly result in a hard fork which makes reconciliation impossible.

There is therefore a need for secure and reliable systems and methods for making offline digital transactions.

SUMMARY OF THE INVENTION

The present invention solves the problem described above by using tamper-resistant, secure integrated circuits to store transaction ledgers and account balances until internet access is restored. After internet access is restored, the transaction record must be synchronized with a back-end server.

In accordance with the present invention, tamper-resistant, secure integrated circuits may be embedded in various form factors, such as a chip card, a mobile phone SIM card, a smart watch, or a bracelet (referred to herein generally as a "smartcard"). Each smartcard may be assigned to a particular user who may access the contents of the smartcard by providing personal identification information (PID), such as a personal identification number (PIN) or biometric information, such as a fingerprint or retinal scan. Stored on each smartcard are the asset balances of one or more accounts owned by or accessible to the user of the smartcard.

When a user, henceforth "the sender", seeks to transfer funds to another user, henceforth "the recipient", according to the present invention, a terminal, such as a mobile phone, may be used to read a smartcard assigned to the sender, henceforth "the sender smartcard". Preferably the terminal includes a wireless transceiver and a means for entering identification information from the sender, such as a key pad, a touchscreen, and/or a biometric reader. The sender may be asked to provide the user's PID to the terminal to confirm initiation of the transaction. Once the PID is provided, the smartcard of the sender digitally signs the outgoing transaction.

The terminal may also be used to read another smartcard assigned to the recipient, henceforth "the recipient smartcard", to complete the transaction. Alternatively, both the sender and recipient may each possess their own terminals, referred to as "the sender terminal" and "the recipient terminal", respectively. In this embodiment, the sender terminal may be used to read the sender smart card. The recipient terminal may be used to read the recipient smartcard and communicate necessary information with the sender terminal to complete the transaction. The recipient smartcard verifies the digital signature of the incoming transaction.

If internet access is available at the time of the transaction, a record of the transaction may be uploaded to a secure and auditable storage structure, such as a relational database or a blockchain platform. Records of the account balances of the users of the smartcards would be updated in accordance with the transaction.

If internet access is unavailable at the time of the transaction, a record of the transaction may be securely stored by both the sender smartcard and the recipient smartcard. Each smartcard may be used to make subsequent transactions without accessing the internet. A record of each transaction for which a smartcard is used is stored on that smartcard. When internet access becomes available, the transaction records are transferred to the internet by a terminal and deleted from the smartcards. Records of the account balances of the users of the smartcards would be updated in accordance with the transaction. Also, the net effect of any transactions recorded by the online storage structure while the user of a smartcard was unable to access the internet (e.g., direct deposit of the user's salary to his account, interest earned on the account balance) would be conveyed to the smartcard to update the account balance stored on the smartcard.

An exemplary method according to the present invention to securely process a digital transactions between a sender and a recipient using a single terminal, may include the following steps: (1) storing on a sender secure integrated circuit a sender public key certificate and the corresponding sender private key, a sender account having a sender account number and a sender account balance, and sender personal identification information; (2) storing on a recipient secure integrated circuit a recipient public key certificate and the corresponding recipient private key, a recipient account having a recipient account number and a recipient account balance, and recipient personal identification information; (3) using a terminal to read from the recipient secure integrated circuit the recipient account number; (4) providing to the terminal identifying information of the sender and a transaction value; (5) determining whether the identifying information of the sender corresponds with the sender personal identification information stored on the sender secure integrated circuit; (6) using the terminal to transmit the recipient account number and transaction value to the sender secure integrated circuit; (7) using the sender secure integrated circuit to generate and digitally sign with the sender private key a transaction record identifying a digital transaction comprising a transfer of said transaction value from the sender account to the recipient account; (8) storing the transaction record on the sender secure integrated circuit; (9) decreasing the sender account balance by the transaction value; (10) using the terminal to read the transaction record from the sender secure integrated circuit; (11) using the terminal to transmit the transaction record to the recipient secure integrated circuit; (12) using the recipient secure integrated circuit to verify the digital transaction; (13) storing the transaction record on the recipient secure integrated circuit; (14) increasing the recipient account balance by the transaction value; and (15) using a terminal to transmit the transaction record over the Internet to a back-end server. The transaction record may be transmitted to the back-end server from the sender secure integrated circuit. The method may then further comprise receiving an indication that the transmission was successful, and upon receiving the indication, deleting the transaction record from the sender secure integrated circuit. Alternatively, the transaction record may be transmitted to the back-end server from the recipient secure integrated circuit. In that case, the method may then further comprise receiving an indication that the transmission was successful, and upon receiving the indication, deleting the transaction record from the recipient secure integrated circuit.

Another exemplary method according to the present invention to securely process a digital transactions between a sender and a recipient using two terminals (e.g., a "sender terminal" and a "recipient terminal"), may include the following steps: (1) storing on a sender secure integrated circuit a sender public key certificate and the corresponding sender private key, a sender account having a sender account number and a sender account balance, and sender personal identification information; (2) storing on a recipient secure integrated circuit a recipient public key certificate and the corresponding recipient private key, a recipient account having a recipient account number and a recipient account balance, and recipient personal identification information; (3) providing to a sender terminal identifying information of the sender and a transaction value; (4) determining whether the identifying information of the sender corresponds with the sender personal identification information stored on the sender secure integrated circuit; (5) using a recipient terminal to read from the recipient secure integrated circuit the recipient account number; (6) using the recipient terminal to transmit the recipient account number to the sender terminal; (7) using the sender terminal to transmit the recipient account number and transaction value to the sender secure integrated circuit; (8) using the sender secure integrated circuit to generate and digitally sign with the sender private key a transaction record identifying a digital transaction comprising a transfer of said transaction value from the sender account to the recipient account; (9) storing the transaction record on the sender secure integrated circuit; (10) decreasing the sender account balance by the transaction value; (11) using the sender terminal to read the transaction record from the sender secure integrated circuit; (12) using the sender terminal to transmit the transaction record to the recipient terminal; (13) using the recipient terminal to transmit the transaction record to the recipient secure integrated circuit; (14) using the recipient secure integrated circuit to verify the digital transaction; (15) storing the transaction record on the recipient secure integrated circuit; (16) increasing the recipient account balance by the transaction value; and (17) transmitting the transaction record to a back-end server. The transaction record may be transmitted to the back-end server from the sender secure integrated circuit using the sender terminal. The method may then further comprise receiving an indication that the transmission was successful, and upon receiving the indication, deleting the transaction record from the sender secure integrated circuit. Alternatively, the transaction record may be transmitted to the back-end server from the recipient secure integrated circuit using the recipient terminal. In that case, the method may further comprise receiving an indication that the transmission was successful, and upon receiving the indication, deleting the transaction record from the recipient secure integrated circuit.

Numerous variations may be practiced in the preferred embodiment.

BRIEF DESCRIPTION OF THE DRAWINGS

A further understanding of the invention can be obtained by reference to exemplary embodiments set forth in the illustrations of the accompanying drawings. Although the illustrated embodiments are merely exemplary of systems, methods, and apparatuses for carrying out the invention, both the organization and method of operation of the invention, in general, together with further objectives and advantages thereof, may be more easily understood by reference to the drawings and the following description. Like reference numbers generally refer to like features (e.g., functionally similar and/or structurally similar elements).

The drawings are not necessarily depicted to scale; in some instances, various aspects of the subject matter disclosed herein may be shown exaggerated or enlarged in the drawings to facilitate an understanding of different features. Also, the drawings are not intended to limit the scope of this invention, which is set forth with particularity in the claims as appended hereto or as subsequently amended, but merely to clarify and exemplify the invention.

DETAILED DESCRIPTION OF THE INVENTION

Figure 1:
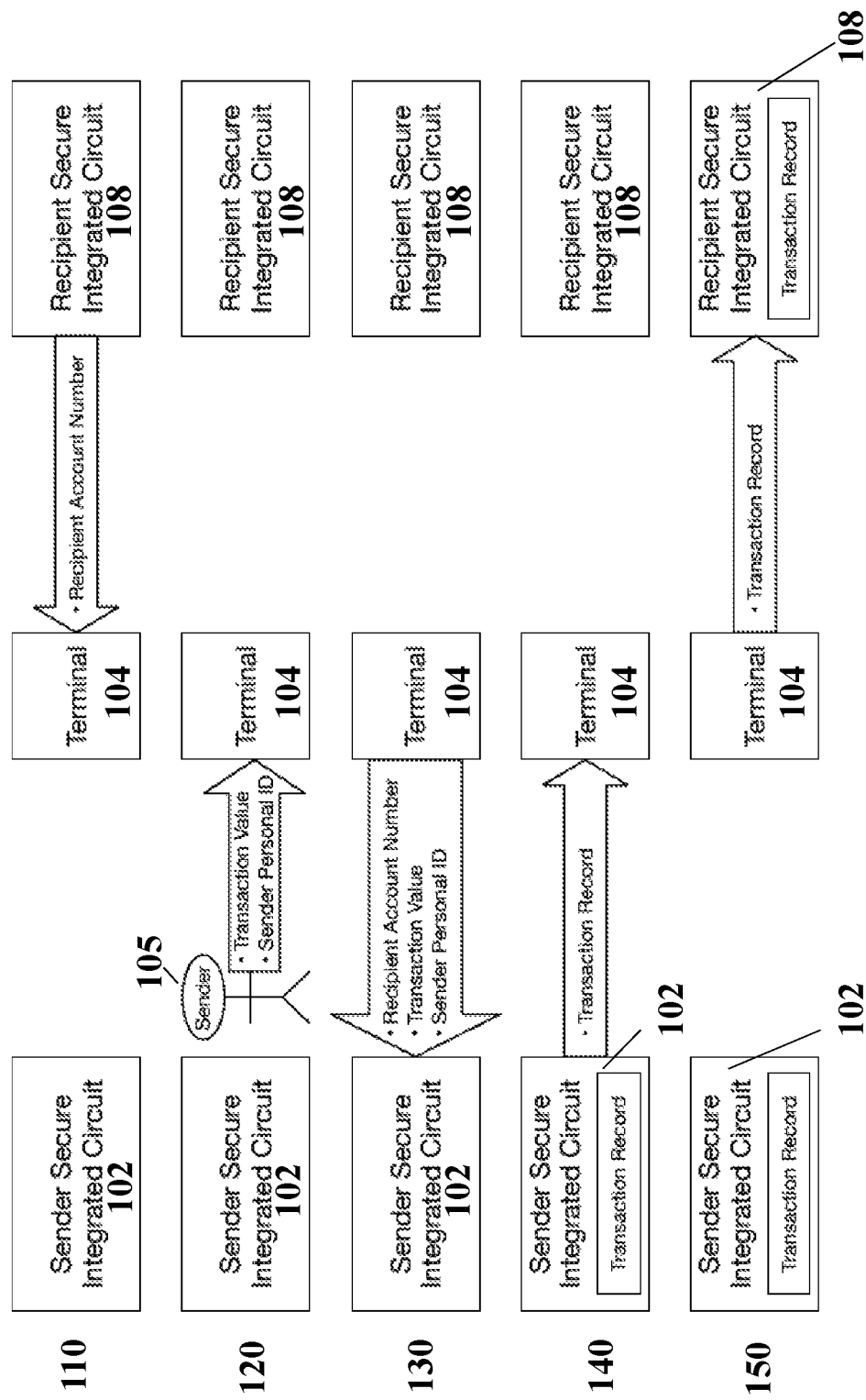
FIG. 1 depicts a flowchart in accordance with the present invention.

The invention may be understood more readily by reference to the following detailed descriptions of embodiments of the invention. However, techniques, systems, and operating structures in accordance with the invention may be embodied in a wide variety of forms and modes, some of which may be quite different from those in the disclosed embodiments. Also, the features and elements disclosed herein may be combined to form various combinations without exclusivity, unless expressly stated otherwise. Consequently, the specific structural and functional details disclosed herein are merely representative. Yet, in that regard, they are deemed to afford the best embodiments for purposes of disclosure and to provide a basis for the claims herein, which define the scope of the invention.

As used in the specification and the appended claims, the singular forms "a", "an", and "the" include plural referents unless the context clearly indicates otherwise. Use of the term "exemplary" means illustrative or by way of example, and any reference herein to "the invention" is not intended to restrict or limit the invention to the exact features or steps of any one or more of the exemplary embodiments disclosed in the present specification. Also, repeated use of the phrase "in one embodiment," "in an exemplary embodiment," or similar phrases do not necessarily refer to the same embodiment, although they may. It is also noted that terms like "preferably," "commonly," and "typically," are not used herein to limit the scope of the claimed invention or to imply that certain features are critical, essential, or even important to the structure or function of the claimed invention. Rather, those terms are merely intended to highlight alternative or additional features that may or may not be used in a particular embodiment of the present invention.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Unless defined otherwise, all technical terms used herein have the same meaning as commonly understood by one of ordinary skill in the art to which this invention belongs. Although any methods and materials similar or equivalent to those described herein can be used in the practice or testing of the present invention, some potential and preferred methods and materials are now described.

The Mobile Transaction Platform (henceforth MTAP) described herein is a platform for mobile money transfer designed to be used in crises, emergencies, and third-world environments. MTAP allows secure and trustworthy transactions to be conducted even in the absence of an Internet connection. An account holder in the MTAP system only needs a commercial, off-the-shelf NFC-enabled smartphone to function as a terminal, and a contactless JavaCard smart card running custom software provided to the account holder upon registration. The term "smartphone" as used herein refers to smartphones, tablets, personal data assistants, laptop computers, and other personal electronic devices with similar functionality.

The MTAP system is a centralized system like PayPal or AliPay, and unlike Bitcoin or Ethereum. It consists of three components: a back-end server, a smartphone application for NFC-enabled smartphones, and a contactless smart card running a JavaCard applet. The back-end server contains the authoritative record of all accounts and transactions. The smartphone application must connect to the back-end server to register an account in the MTAP system; after that, the smartphone application must periodically reconnect to the server to synchronize transactions. The contactless smart card runs a JavaCard applet that maintains the account balance, stores the cryptographic keys belonging to the account and signs outgoing transactions.

Key Management

The description of the MTAP system herein utilizes a simple key management scheme. This naïve key management scheme may be replaced with a more sophisticated key management scheme without modifying the rest of the system.

The MTAP system utilizes asymmetric cryptography extensively. In the preferred embodiment, ECDSA is used, but any other asymmetric cryptographic algorithm may be used. In the naïve key management scheme, every smart card has a smart card public/private key pair. In addition, there exists a master public/private key pair, which serves as a centralized trust anchor. Every smart card knows the back-end server's master public key, while the master private key is only known to the back-end server.

An account holder's smart card generates its smart card key pair when a smart card is issued to an account holder. The smart card private key never leaves the confines of the smart card. Meanwhile, the smart card public key is retrieved from the smart card and registered with the back-end server. The back-end server then signs the smart card public key with the master private key; the resulting digital signature is then stored in the smart card and serves as the smart card's public key certificate. The public key certificate enables any other smart card to verify that a transaction signed by the corresponding private key originated from a legitimate smart card that has been registered with the back-end server.

Smart Card

Smart cards are well-known in the art as portable and inexpensive tamper-resistant computers used for storing and performing computations upon sensitive data. They undergo rigorous testing and certification for side channel attacks, invasive attacks, software bugs, and other weaknesses. In the MTAP system, a contactless smart card is used to ensure the security and integrity of an account holder's funds and transaction record. The smart card prevents malicious third parties from performing transactions that the account holder did not authorize, and also prevents either the account holder or a malicious third party from tampering with the account balance and spending more money than exists in the account (also known as double-spending).

To maintain these security guarantees, the smart card stores the authoritative value of the account balance. All transactions must be signed with the sender's smart card private key. This signature is generated within the smart card itself. When the smart card generates the signature, it checks whether the current account balance is less than the transaction amount. If the current account balance is less than the transaction amount, the smart card will not sign the transaction. Otherwise, the smart card signs the transaction and decrements the current account balance by the transaction amount.

Transactions

There are two kinds of transactions: offline transactions and remote transactions. Offline transactions are conducted between two smart cards and do not involve the back-end server at the time the transaction is conducted. Offline transactions are only uploaded to the back-end server after the transaction has been completed. Remote transactions are conducted between the sender and the back-end server. A particularly novel aspect of the inventions described herein is the ability to securely perform and record offline transactions.

A transaction record necessarily consists of fields containing the following information:
1. the date and time the transaction was conducted according to the sender's clock,
2. the account number of the sender,
3. the account number of the recipient,
4. the currency in which the transaction is denominated,
5. the transaction amount,
6. a digital signature of fields 1 through 5 signed with the sender's smart card private key,
7. the sender's smart card public key,
8. the sender's certificate, which consists of a digital signature of the sender's smart card public key signed with the master private key.

A transaction may optionally store more information to which the digital signature may be applied.

The process for conducting a transaction between two accounts depends on whether both account holders possess a smartphone that can serve as a terminal. In a preferred embodiment, both account holders share a smartphone which serves as a terminal. This smartphone may belong to the sender, the recipient, or a third party. Both the sender's smart card and the recipient's smart card communicate with the shared smartphone. In a variant of that preferred embodiment, the smartphone belongs to the recipient and the recipient's smart card is housed in the same enclosure as the smartphone.

In another embodiment, both the sender and the recipient each possesses a smartphone. The sender's smart card only communicates with the sender's smartphone, while the recipient's smart card only communicates with the recipient's smartphone. Both smartphones communicate with each other via any suitable network technology, such as the Internet, a cell network, or Bluetooth. These embodiments will be described in subsequent sections.

Preferred Embodiment with One Smartphone

FIG. 1 discloses a flowchart depicting an embodiment of the present invention involving a single terminal (e.g., smartphone). The parenthesized statements below represent places where a system with a more sophisticated key management scheme or security feature could perform additional actions. In the descriptions below, the recipient is referred to as "he" and the sender is referred to as "she".

At Step 110, the recipient taps his smart card (108) against smartphone (104). Smartphone (104) reads the recipient's account number from the recipient's smart card (108). (Smartphone (104) may additionally read other information from the recipient's smart card (108)).

At Step 120, smartphone (104) is passed to the sender (105), who enters the transaction amount and her personal identification information. The term "personal identification information" as used herein may include a personal identification number and/or biometric information such as a fingerprint and/or the shape of the sender's or recipient's face.

At Step 130, sender (105) taps her smart card (102) against smartphone (104). Smartphone (104) transmits the recipient's account number, the transaction value, and the sender's personal identification information to the sender's smart card (102). (The smartphone may additionally transmit other information to the sender's smart card. (102))

At Step 140, the sender's smart card (102) checks if the personal identification information entered by sender (105) matches the personal identification information stored on the sender's smart card (102). If they match, the sender's smart card (102) generates and signs a transaction record with the sender's smart card private key, as described in the previous section. The sender's smart card (102) then stores this transaction record in its internal memory and decreases the account balance on the sender's smart card (102) by the transaction amount. Finally, smartphone (104) reads the transaction record from the sender's smart card (102).

At Step 150, the recipient taps his smart card (108) against smartphone (104) again. Smartphone (104) transmits the transaction record to the recipient's smart card (108), which then verifies the validity of the digital signature and the certificate. If both the digital signature and the certificate are valid, the recipient's smart card (108) then stores the transaction record in its internal memory and increases the account balance on the recipient's smart card (108) by the transaction amount. (The recipient's smart card (108) may additionally verify other information stored in the transaction.)

Another Embodiment with Two Smartphones

Figure 2:
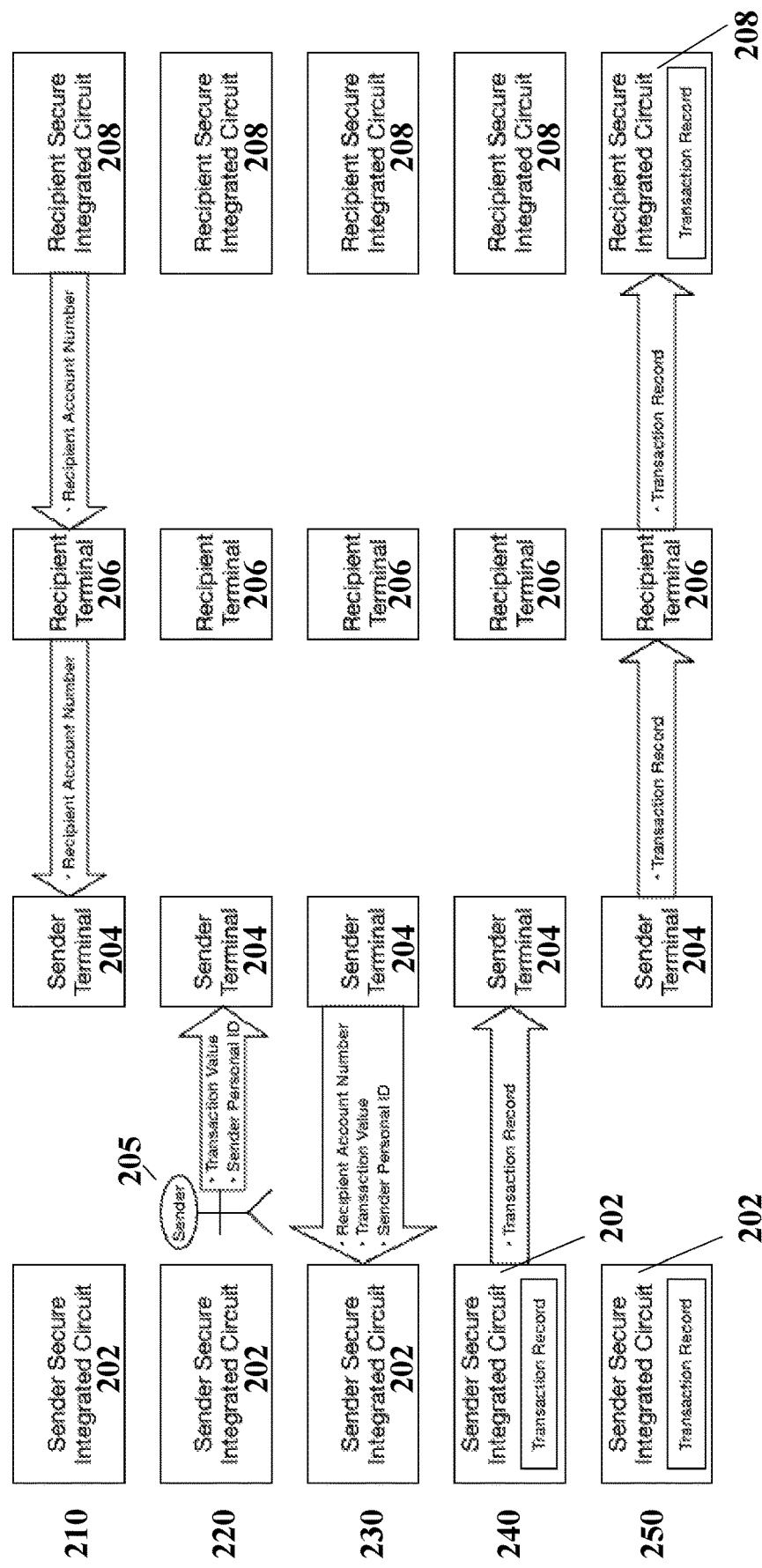
FIG. 2 depicts a flowchart in accordance with the present invention.

FIG. 2 discloses a flowchart depicting an embodiment of the present invention involving two terminals (e.g., smartphones). The parenthesized statements represent places where a system with a more sophisticated key management scheme or security feature could perform additional actions.

At Step 210, the recipient taps his smart card (208) against his smartphone (206). The recipient's smartphone (206) reads the recipient's account number from the recipient's smart card (208) and transmits it to the sender's smartphone (204). (The recipient's smartphone may additionally read other information from the recipient's smart card.)

At Step 220, the sender (205) enters the transaction amount and her personal identification information on her smartphone (204).

At Step 230, the sender (205) taps her smart card (202) against her smartphone (204). The sender's smartphone (204) transmits the recipient's account number, the transaction value, and the sender's personal identification information to the sender's smart card (202). (The smartphone may additionally transmit other information to the sender's smart card (202).)

At Step 240, the sender's smart card (202) checks if the personal identification information entered by the sender (205) matches the personal identification information stored on the sender's smart card (202). If they match, the sender's smart card (202) generates and signs a transaction record with the sender's smart card private key, as described in the previous section. The sender's smart card (202) then stores this transaction record in its internal memory and decreases the account balance on the sender's smart card (202) by the transaction amount. Finally, the sender's smartphone (204) reads the transaction record from the sender's smart card (202) and transmits it to the recipient's smart phone (206).

At Step 250, the recipient taps his smart card (208) against his smartphone again (206). The recipient's smartphone (206) transmits the transaction record to the recipient's smart card (208), which then verifies the validity of the digital signature and the certificate. If both the digital signature and the certificate are valid, the recipient's smart card (208) then stores this transaction record in its internal memory and increases the account balance on the recipient's smart card (208) by the transaction amount. (The recipient's smart card (208) may additionally verify other information stored in the transaction.)

Synchronization of Transactions

The MTAP system is a fundamentally centralized transaction system where the authoritative record of the transaction ledger lives on the back-end server. Therefore, all transactions that are stored on smart cards must be eventually synchronized to the back-end server. A synchronization consists of the following steps:

1. The account holder taps his smart card against a smartphone. The smartphone reads all transaction records stored on the smart card and uploads them to the back-end server. The back-end server stores the transaction records in its database.
2. The back-end server replies to the smartphone with a confirmation for each transaction. Each confirmation is digitally signed with the master private key. The smartphone then transmits the confirmations to the smart card, which verifies the digital signatures in each confirmation and deletes the corresponding transaction record for each successful confirmation. This step prevents a malicious attacker from deleting valid transactions on a smart card.

This synchronization operation may be performed at any time after a transaction has been completed, but it is preferable to perform a synchronization as soon as the smart card encounters a smartphone that has an Internet connection. Memory space on a smart card is finite and eventually a smart card will run out of space for transactions. When this occurs, the account holder is required to perform a synchronization operation before he can use the smart card again.

While the invention has been described in detail with reference to embodiments for the purposes of making a complete disclosure of the invention, such embodiments are merely exemplary and are not intended to be limiting or represent an exhaustive enumeration of all aspects of the invention. It will be apparent to those of ordinary skill in the art that numerous changes may be made in such details, and the invention is capable of being embodied in other forms, without departing from the spirit, essential characteristics, and principles of the invention. Also, the benefits, advantages, solutions to problems, and any elements that may allow or facilitate any benefit, advantage, or solution are not to be construed as critical, required, or essential to the invention. The scope of the invention is to be limited only by the appended claims.

What is claimed is:

1. A method for securely processing one or more digital offline transactions between a sender and a recipient, comprising:
   storing on a sender secure integrated circuit a sender public key certificate and the corresponding sender private key, a sender account having a sender account number and a sender account balance, and sender personal identification information;
   storing on a recipient secure integrated circuit a recipient public key certificate and the corresponding recipient private key, a recipient account having a recipient account number and a recipient account balance, and recipient personal identification information;
   using a terminal to read from the recipient secure integrated circuit the recipient account number, wherein neither the sender secure integrated circuit nor the recipient secure integrated circuit is part of the terminal;
   providing to the terminal identifying information of the sender and a transaction value;
   determining whether the identifying information of the sender corresponds with the sender personal identification information stored on the sender secure integrated circuit;
   transmitting the recipient account number and transaction value from the terminal to the sender secure integrated circuit;
   using the sender secure integrated circuit to generate and digitally sign with the sender private key a transaction record identifying a digital offline transaction comprising a transfer of said transaction value from the sender account to the recipient account;
   storing the transaction record on the sender secure integrated circuit;
   decreasing the sender account balance by the transaction value;
   using the terminal to read the transaction record from the sender secure integrated circuit;
   transmitting the transaction record from the terminal to the recipient secure integrated circuit;
   using the recipient secure integrated circuit to verify the digital offline transaction;
   storing the transaction record on the recipient secure integrated circuit;
   increasing the recipient account balance by the transaction value; and
   transmitting the transaction record from the terminal over the Internet to a back-end server.

2. The method of claim 1, wherein the method further comprises:
   receiving an indication that the transmission was successful; and
   upon receiving the indication, deleting the transaction record from the sender secure integrated circuit.

3. The method of claim 1, wherein the method further comprises:
   receiving an indication that the transmission was successful; and
   upon receiving the indication, deleting the transaction record from the recipient secure integrated circuit.

4. The method of claim 1, wherein the identifying information of the sender comprises biometric information.

5. The method of claim 4, wherein the biometric information is a fingerprint.

6. The method of claim 4, wherein the biometric information comprises information about the shape of the sender's face.

7. The method of claim 1, wherein the identifying information of the sender comprises a personal identification number.

8. The method of claim 1, wherein the terminal is a mobile phone.

9. The method of claim 1, wherein the secure integrated circuits are each embedded in a chip card.

10. The method of claim 1, wherein the secure integrated circuits are each embedded in a SIM card.

11. The method of claim 1, wherein the secure integrated circuits are each embedded in a smart watch.

12. The method of claim 1, wherein the transaction record comprises:

(a) a date and time the transaction was conducted,
(b) the sender account number,
(c) the recipient account number,
(d) a currency in which the digital offline transaction is denominated,
(e) the transaction value.

13. A system for securely processing one or more digital offline transactions between a sender and a recipient, comprising:
a sender secure integrated circuit configured to store a sender public key certificate and the corresponding sender private key, a sender account having a sender account number and a sender account balance, and sender personal identification information;
a recipient secure integrated circuit configured to store a recipient public key certificate and the corresponding recipient private key, a recipient account having a recipient account number and a recipient account balance, and recipient personal identification information;
a terminal configured to:
read from the recipient secure integrated circuit the recipient account number;
receive identifying information of the sender;
receive a transaction value;
determine whether the identifying information of the sender corresponds with the sender personal identification information stored on the sender secure integrated circuit;
transmit to the sender secure integrated circuit the recipient account number and transaction value;
wherein neither the sender secure integrated circuit nor the recipient secure integrated circuit is part of the terminal;
wherein said sender secure integrated circuit is further configured to
generate and digitally sign a transaction record with the sender private key identifying a digital offline transaction comprising a transfer of said transaction value from the sender account to the recipient account;
store the transaction record on the sender secure integrated circuit;
decrease the sender account balance by the transaction value;
wherein said terminal is further configured to:
read the transaction record from the sender secure integrated circuit;
transmit the transaction record to the recipient secure integrated circuit;
wherein said recipient secure integrated circuit is further configured to verify the digital offline transaction;
store the transaction record on the recipient secure integrated circuit; and
increase the recipient account balance by the transaction value;
wherein said terminal is further configured to transmit the transaction record to a back-end server if Internet access is available.

14. The system of claim 13, wherein said terminal is further configured to delete the transaction record from the sender secure integrated circuit upon receiving confirmation from the back-end server that the transaction record was successfully transmitted.

15. The system of claim 13, wherein said terminal is further configured to delete the transaction record from the recipient secure integrated circuit upon receiving confirmation from the back-end server that the transaction record was successfully transmitted.

16. The system of claim 13, wherein the identifying information of the sender comprises biometric information.

17. The system of claim 16, wherein the biometric information is a fingerprint.

18. The system of claim 16, wherein the biometric information comprises information about the shape of the sender's face.

19. The system of claim 13, wherein the identifying information of the sender comprises a personal identification number.

20. The system of claim 13, wherein the terminal is a mobile phone.

21. The system of claim 13, wherein the secure integrated circuits are each embedded in a chip card.

22. The system of claim 13, wherein the secure integrated circuits are each embedded in a SIM card.

23. The system of claim 13, wherein the secure integrated circuits are each embedded in a smart watch.

24. The system of claim 13, wherein the transaction record comprises:
(a) a date and time the transaction was conducted,
(b) the sender account number,
(c) the recipient account number,
(d) a currency in which the digital offline transaction is denominated,
(e) the transaction value.

* * * * *